May 19, 1959

H. J. BERENSON 2,887,018

CONTINUOUS ASSEMBLY MACHINE

Filed Nov. 26, 1952

INVENTOR.
HENRY J. BERENSON
BY
Wheeler, Wheeler & Wheeler
ATTORNEYS

May 19, 1959

H. J. BERENSON

2,887,018

CONTINUOUS ASSEMBLY MACHINE

Filed Nov. 26, 1952

INVENTOR.
HENRY J. BERENSON
BY
Wheeler, Wheeler & Wheeler
ATTORNEYS.

INVENTOR.
HENRY J. BERENSON
Wheeler, Wheeler & Wheeler
ATTORNEYS.

United States Patent Office 2,887,018
Patented May 19, 1959

2,887,018

CONTINUOUS ASSEMBLY MACHINE

Henry J. Berenson, Milwaukee, Wis., assignor to National Paper Can & Tube Company, Milwaukee, Wis., a corporation of Wisconsin Application November 26, 1952, Serial No. 322,633

20 Claims. (Cl. 93—1)

This invention relates to continuous assembly machines.

This application is a continuation in part of my copending application Serial No. 109,767 filed August 11, 1949, now abandoned.

It is the principal object of the invention to provide assembly machines for carrying out certain of my new principles of continuous adhesive fabrication of products. In the several embodiments of the invention to be hereinafter disclosed, I provide for the continuous assembly of flangeless ribbon blocks and of flanged spools.

All embodiments of the invention are characterized by the loose assembly of prefabricated and preglued components at an assembly station and the transfer of the loose components into a restricted throat for integration and for curing of the glue bond for ultimate ejection of completed ribbon blocks or spools. For this purpose I employ a reciprocative plunger which has a path of travel through the assembly station and into the restricted throat. In the embodiment of the invention adopted to handle flanged spools I also provide apparatus to accommodate the spool flanges despite the endwise assembly of the components.

Another object of the invention is to coordinate the action of my assembly machine with a pregluing machine for certain of the components of my assembled products, delivery of said preglued components to an assembly station and delivery of other components to the same station, all in timed coordination for manual assembly at said station. In the devices of all of the embodiments of my invention the feed of the components to the manual assembly station is such that the components are prepared and offered to the operator in accordance with the demands of the final assembly machine. In practice the plunger which picks up the manually positioned components and transfers these to an assembly throat is actuated in timed coordination with all other operations. Thus, the transfer of components from the assembly station to the throat is automatically correlated to the feed of components to the assembly station.

I shall first refer to the principal structural elements of the embodiment of my machine shown in Figs. 1–10. This embodiment of my invention is particularly adapted to produce ribbon blocks, such as those shown in Figs. 6 and 7. These blocks are assembled or fabricated by bringing together a core 10 and head discs 11 and 12. Description of the embodiment of my machine shown in Figs. 11–24 will be deferred until later in the specification. The Figs. 11–24 embodiment of my machine is adopted to produce the flanged spool shown in Fig. 12.

Figures 1, 5, 6, 7:
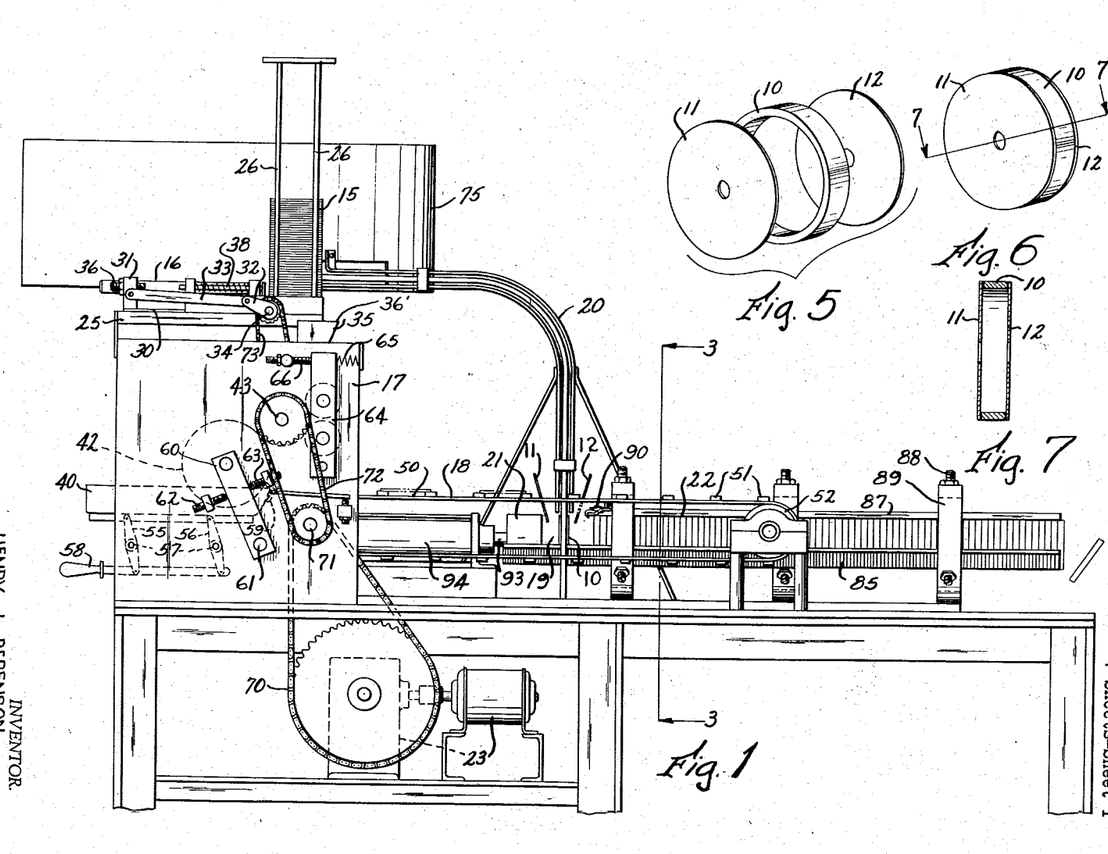
Fig. 1 is a side elevation of one embodiment of my continuous assembly machine.
Fig. 5 is a perspective of the three components of the ribbon block to be assembled in the machine of Fig. 1.
Fig. 6 is a perspective of my complete, assembled ribbon block.
Fig. 7 is a section on line 7—7 of Fig. 6.

At the left, in Fig. 1, is a stock pile 15 of head discs. At 16 I provide a disc feeder to successively feed discs into a pregluing apparatus 17. At 18 I provide a conveyor to carry preglued discs to loading station 19. To this same loading station 19 I feed cores through a chute feeder 20.

An assembly plunger apparatus at 21 feeds components from loading state 19 into assembly throat 22. Through this throat the components are forced and their assembly is completed adhesively under pressure.

Power apparatus to the various automatic portions of my machine include a motor and speed reducer 23 with various chain or belt drives to be described below.

Disc feeding from stock pile

Since each of my ribbon blocks of Figs. 5–7 requires head discs, 11 and 12, my pregluing machine 17 has two stock piles of discs, 15, supported upon a bed plate 25 and supported in stacked relation by rods 26. These rods extend upwardly from stack plate 27 which is apertured at 28 to pass the discs and is slotted along its lower face to act as a guide for disc feeding pusher plates 29 and 30 which are part of the disc feeder 16. These pusher plates have a reciprocable header 31 common to the pusher plates. The header 31 is in turn connected to a crank arm 32 by means of pitman 33 so that during the constant rotation of shaft 34 the pusher plates 29 and 30 constantly reciprocate to push successive discs, 11 and 12, from the bottom of each of the stacks 15 into a funnel 35 for a pregluing operation in apparatus 17.

Figures 3, 4:
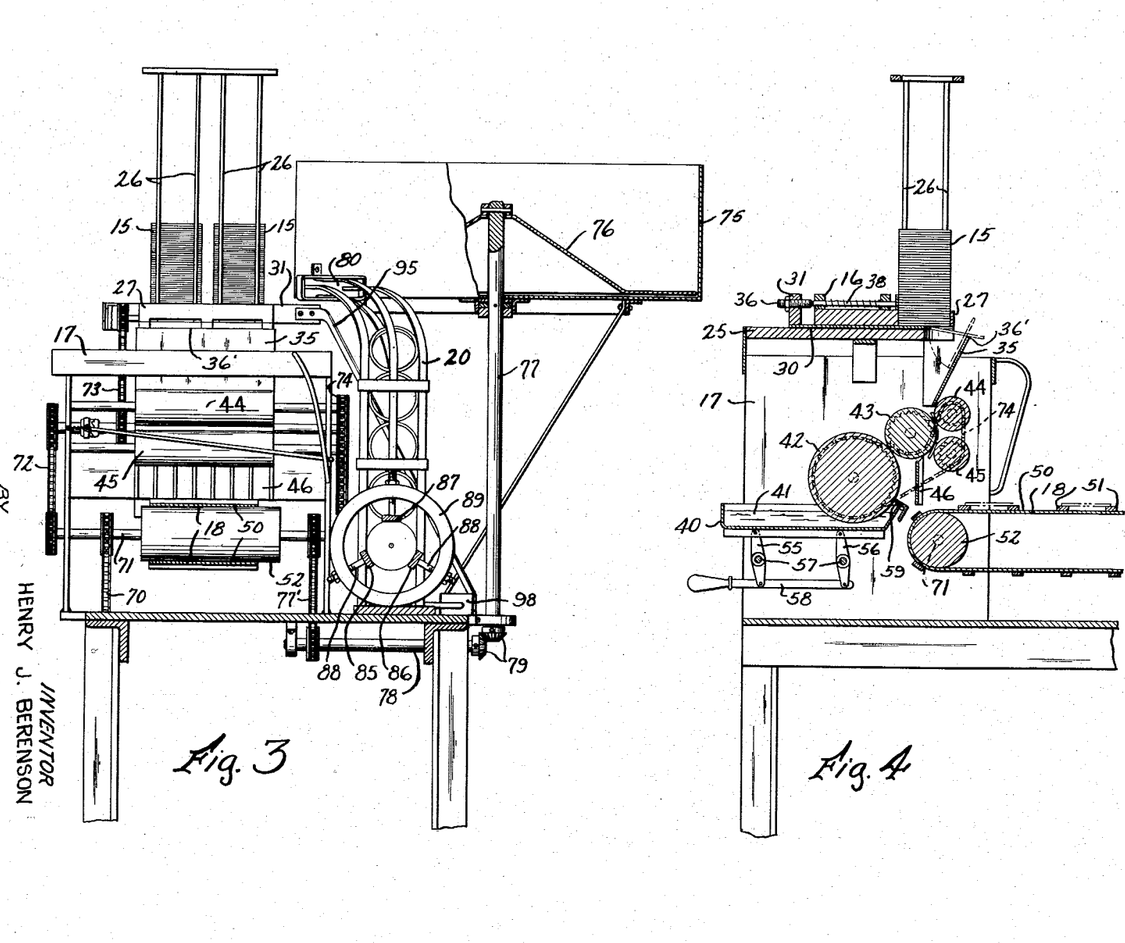
Fig. 3 is a section on line 3—3 of Fig. 1.
Fig. 4 is a section on line 4—4 of Figure 2, the stack of discs being shown in elevation.
Figure 8:
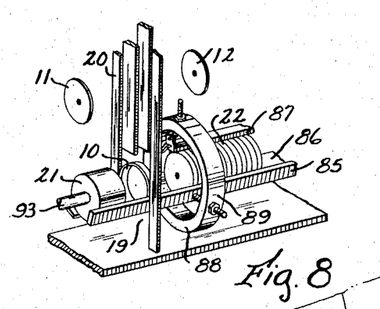
Fig. 8 is a perspective of the assembly station in the machine of Fig. 1, components to be fed into the throat being shown somewhat schematically.

At the same time that the header 31 is moved in a disc feeding operation, screws 36 and 37 are brought against spring retracted, stack bracing plungers 38 and 39, respectively, to press the heads thereof against the stacks, thus aligning them against rods 26 in position for gravity feed through bedplate 25. As the trailing margins of the fed discs clear the bottom of each stack and the bedplate, they fall as follows:

It will be noted that the delivery margin of the bed plate 25 has semi-circular configurations to conform to the curves of discs 11—12. As each disc is fed from its position in the stack, its forward margin extends to the lip 36' of the funnel 35, where it is momentarily supported when the disc drops through the semi-circular opening referred to. This sequence is shown in Fig. 4 in dotted lines, and I am thus assured that the disc is fed down the incline face of the inside of funnel 35 in a correct position for reception between the rolls of my pregluing apparatus.

Disc pregluing

Within the housing of my gluing apparatus 17 I provide a tray 40 for liquid adhesive 41; a pickup roll 42 transfers a predetermined quantity of adhesive to applicator roll 43; feed rolls 44 and 45 brace a disc 11 or 12 against the applicator roll for reception of adhesive applied by the applicator roll. Then a doctor plate 46 assures that the disc is removed from the applicator roll and is fed edge down onto stock conveyor 50. This conveyor is in the form of a belt, with spaced cleats 51, riding upon stock conveyor pulleys 52. Since each disc 11 or 12 strikes the relatively slowly moving conveyor with its edge down, the edge is contacted by a cleat 51 and carried forwardly while the upper portion of the disc continues to rest against the doctor plate 46. When the disc finally falls flat upon the conveyor, the disc is supported by the cleats 51 with the adhesive surface on the underside. In this position the discs 11, 12 are carried forwardly to the assembly station 19.

To support the tray 40 of adhesive 41 in horizontal position, I provide levers 55 and 56 upon shafts 57 so that an inter-connected handle bar 58 and both of the levers will simultaneously adjust the tray and bring a metering blade 59 sufficiently close to the pick-up roll 42 to scrape off excess adhesive before it reaches the applicator roll 43.

The shaft of the applicator roll 43 is journaled in fixed relation to the housing of my pregluing apparatus, but shaft pick-up roll 42 is carried in arms 60 pivoted at 61 and disposed between adjusting screws 62 and 63. A somewhat similar, but resilient, mounting 64 for feed rolls 44 and 45 presses these rolls in the direction of the applicator roll under the urge of spring 65; a limit screw at 66 adjustably limits the extent of movement under the pressure exerted by this spring.

Connections for power operation

At 70 I provide a chain drive from power and speed reducer 23 to shaft 71 upon which pulley 52 of conveyor 50 is mounted. From this same shaft 71 to the applicator roll and its shaft 43 I provide another chain drive 72. As seen in Fig. 3, the connection from applicator roll and its shaft 42 to shaft 34 of the disc pusher is provided by means of chain 72. Chain drive connection from the applicator roll and its shaft 43 to the pick-up roll 42 and to the feed rolls 44 and 45 is provided by chain 74. This completes the power connections for the rotative elements of the gluing apparatus 17. Disc feeding conveyor 50 and the apparatus and machine parts thus far described bring to the loading station pairs of discs which have been pushed out of the stacks 15, preglued at 17 and delivered on the conveyor.

Core feeder

To this same loading station 19 of the embodiment of Figs. 1–11, I feed cores 10 in a chute 20, the upper end of which has a hopper 75.

Cores 10 are dumped in quantity into hopper 75 so that they rest upon cone impeller 76 carried by vertical shaft 77. This shaft is power rotated by a power takeoff from shaft 71. This power takeoff includes chain 77', jack shaft 78 and a set of bevel pinions 79.

Figures 9, 10:
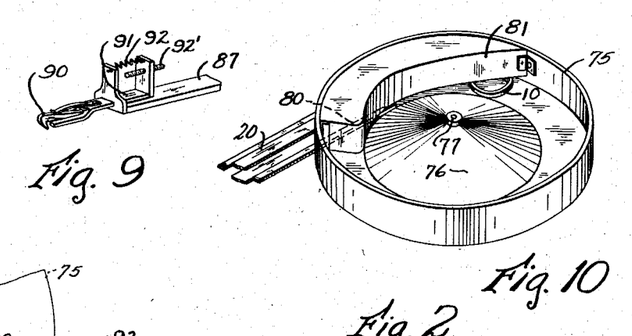
Fig. 9 is a perspective view of a recoil stop finger used at the assembly station in the machine of Fig. 1.
Fig. 10 is a perspective view, in reduced scale, of my core feeder impeller.

As the impeller frictionally urges the cores 10 in a counter-clockwise direction, as seen in Fig. 10, the cores are finally individually, successively aligned with chute 20 at the point 80 where it joins hopper 75. Those cores which fail to align themselves with the chute are diverted by baffle 81 and make another "circuit" in the hopper. Thus cores are fed along the chute 20 and presented at the loading station (see Figs. 1 and 8). I have built up chute 20 out of slats, as shown, but an enclosed chute of sheet metal or other suitable material will be satisfactory if visible feed is not required.

As each core is received into the loading station it prevents a succeeding core from feeding down, and when plunger 21 moves to assemble a ribbon block, as hereinafter described, the plunger occupies the full diameter of the loading station until it is retracted. Thus only one core is fed at a time and, in this embodiment of the invention, no other control device is needed.

Restricted throat assembly

At the loading station 19 space is provided so that an operator may take off from the cleats 51 a pair of preglued discs 11, 12 and dispose them in the loading station. In doing this the operator picks up the two discs in such a way as to apply the adhesive coated surfaces against a core 10, which has been fed into the loading station. The exterior diameter of the discs and core in this embodiment of the invention are identical or as nearly so as machine methods of cutting and forming them may accomplish their operation. To receive the components 10, 11, 12 for a ribbon block, I provide runners 85 and 86 and a top runner 87; each of these runners being supported upon adjustable runner pegs 88 carried by frame rims 89. The runners may be thus adjusted for each size of product and may accommodate components of sizes to make ribbon blocks of larger or smaller diameters. Runners 85 and 86 extend under loading station 19 to provide a trough to receive components 10, 11 and 12, but top runner 87 is shorter and is provided with a recoil check latch 90 shown in detail in Fig. 9. This latch is, in effect, a hooked spring finger forming part of a slide 91 carried by runner 87. Each of these parts, the runner 87 and the slide 91, is L-shaped and a spring 92 between them urges the spring latch forwardly toward the loading station 19. A set screw 92' limits the forward movement.

Since there is some spongy or springy reaction to the compression of blocks in the throat the spring latch 90 engages the last block to have been assembled and prevents its release from the throat. Furthermore, this latch makes it possible for the operator to place the next head disc under the lip of the latch and thus prevent accidental displacement of the disc prior to the next stroke of the assembly plunger.

Aligned with the axis of the throat defined by the runners is the shaft 93 of assembly plunger 21. The shaft is reciprocable in and under the control of a pneumatically operated cylinder and piston, designated generally by the character 94. Therefore, as the plunger 21 is reciprocated under a timing control, which will be described below, a core and its head discs 11, 12 is forced into the throat of the runners. The adjustment of the runners is such that the zone near the loading station 19 freely receives the component 10, 11 and 12 with very little resistance to forward travel under the urge of the plunger 21. However, as the successive groups of components push one another down the throat, the more remote portions of the throat are restricted and the runners are adjusted more closely together, thus dictating the pressure by the pusher 21 that is required to advance the ribbon blocks.

*Assembly plunger timing*

The plunger, as above described, times the dropping of a core according to the reciprocation of the pusher. Timing means are also provided to operate the assembly plunger 21 through one reciprocation in accord with each reciprocation of the pusher 31.

At 95 I provide a valve link which extends from the pusher 31 to a valve control arm 96. Each time the link moves through a complete cycle in time with pusher 31 the cylinder and its piston 21 go through a complete thrust and retraction cycle. For this purpose air or liquid is supplied under pressure through supply pipe 97 and, as controlled by a valve 98 is fed to or relieved from the cylinder in a well-known manner for plunger reciprocation.

From the above description it will be clear that with the motor and speed reducer 23 operating at a predetermined speed, end discs 11, 12 and cores 10 are constantly being fed to the station 19, said discs 11 and 12 having been adhesively coated on one face. As the operator places a core on the runners 85 and 86, with head discs at either end thereof, with the adhesive coated faces against the ends of the core, assembly plunger 21 urges the assembled ribbon block components into the throat defined by the runners 85, 86 and 87. The pressure required to advance the various ribbon blocks through the throat holds the head disc and core for each block in firm relationship during the curing process for the adhesive. The length of the runners is gauged to provide time for this curing process to be sufficiently completed so that complete blocks delivered at the end of the throat (see Fig. 1) are sufficiently "cured" to hold their assembled relationship permanently.

*Flanged spool assembly*

Figures 11, 12, 15, 16, 17:
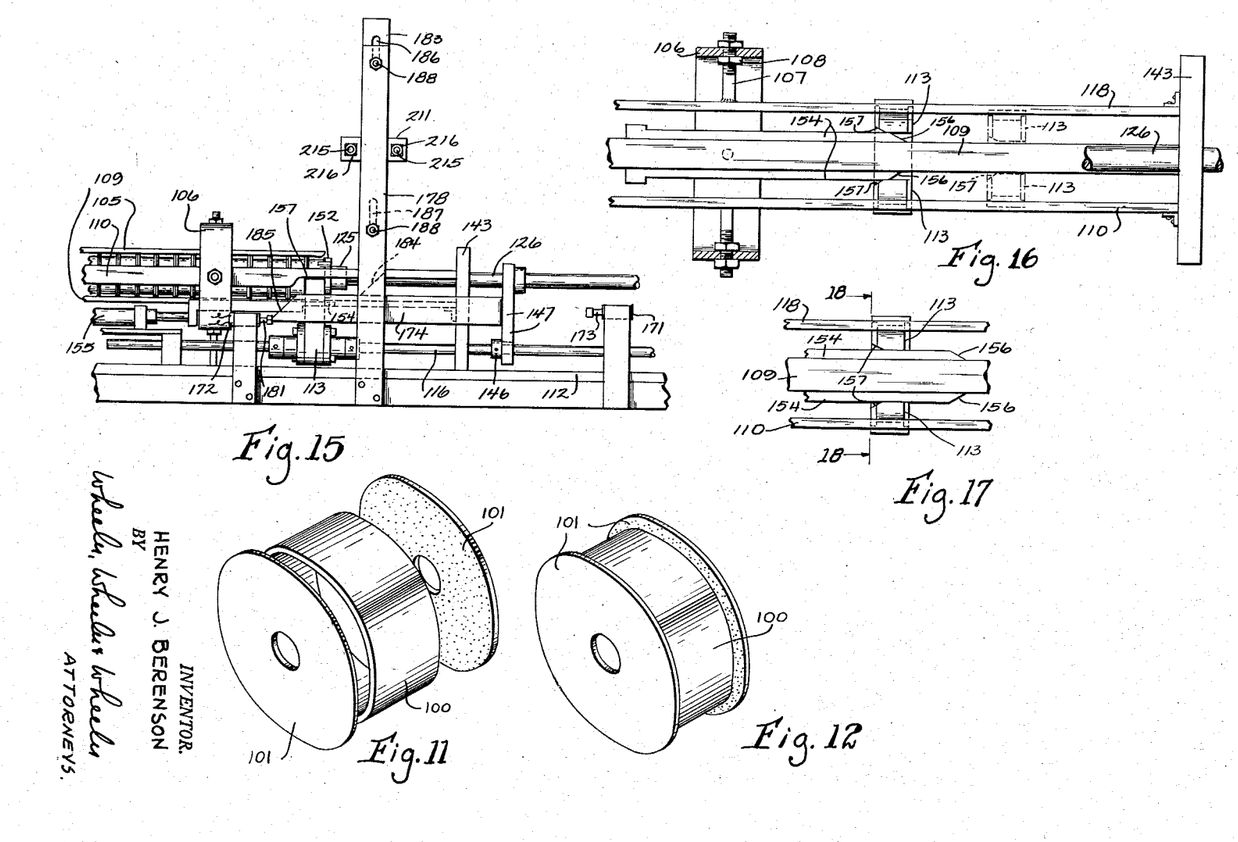
Fig. 11 is a perspective view of the components of my flanged spool, the components being illustrated in spaced relation.
Fig. 12 is a perspective view of my assembled flanged spool.
Fig. 15 is a fragmentary rear elevation of the assembly station and throat portion of the machine shown in Fig. 13, the component carrier being shown in advanced position.
Fig. 16 is a fragmentary plan view on an enlarged scale of the throat portion of the assembly machine, the component carrier being shown en route to the throat in dotted lines and full lines at the throat.
Fig. 17 is an enlarged plan view of the assembly throat after the carrier expanding cam rails have been advanced beyond the entrance of the throat.

In the embodiment of the invention shown in Figs. 11 through 24, I especially adapt the apparatus at the assembly station for the continuous assembly of the flanged spool shown in Figs. 11 and 12. The spool comprises a core 100 and identical head discs 101. As in the embodiment of Figs. 1 through 10, I provide a pregluing device 17 which is substantially identical with the one illustrated in Fig. 1. This component, accordingly, will not be further described and reference is made to the description thereof earlier in this specification. The pregluing device 17 feeds preglued discs 101 onto the belt 103 for delivery to the assembly station.

Figure 2:
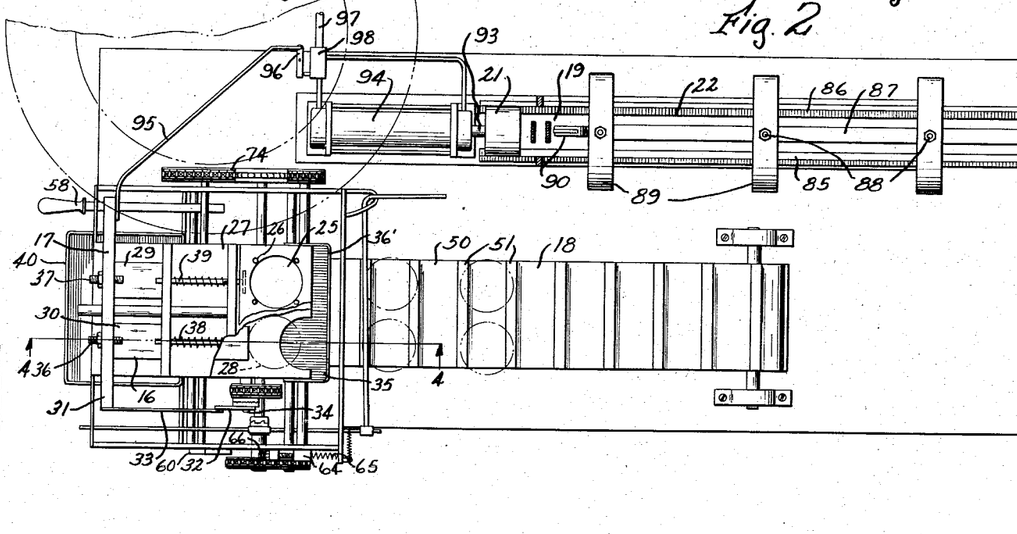
Fig. 2 is a plan view of the machine shown in Fig. 1, except that my core feeder is deleted; its general location being shown in dot and dash lines.

As will be hereinafter explained the means for linking the movement of the head disc pusher 31 to the plunger actuating mechanism is slightly different from that shown in Fig. 2. The operation of these parts are substantially the same the difference is only in mechanism to accommodate for the change of structure in the plunger and its actuating connections.

Figures 13, 14:
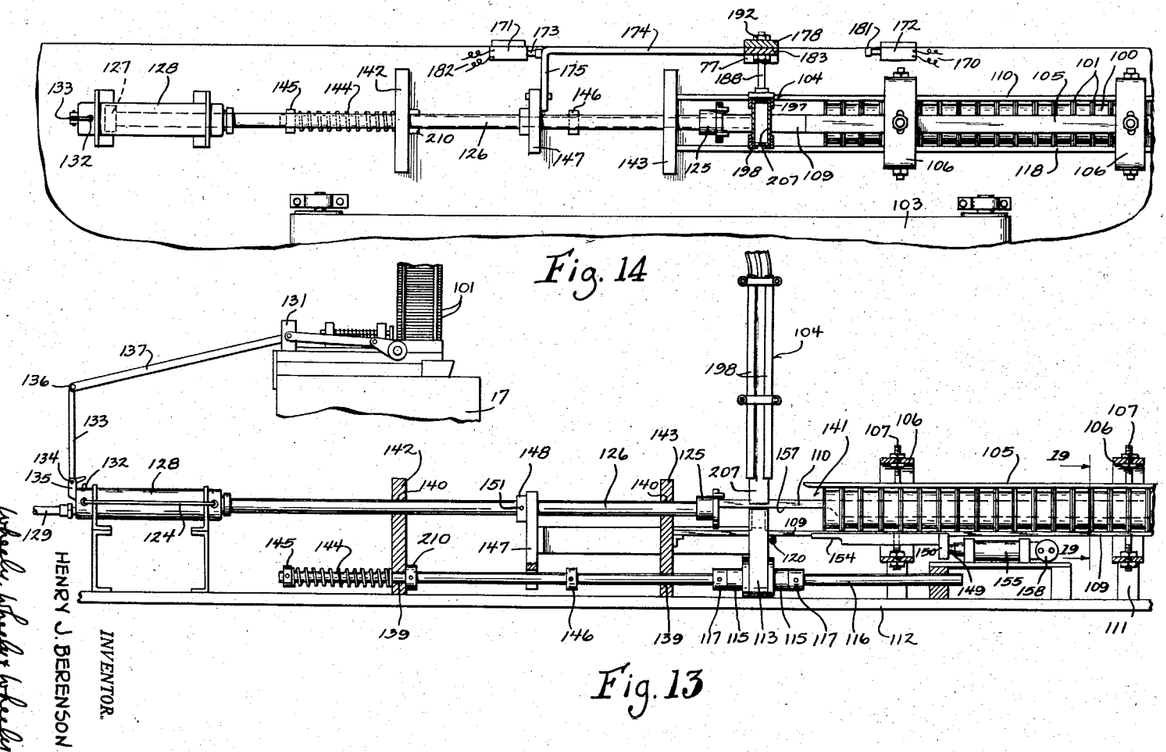
Fig. 13 is a somewhat diagrammatic and fragmentary rear elevation of the assembly portion of the embodiment of my machine adapted to assemble the flanged spool of Figs. 11 and 12.
Fig. 14 is a fragmentary plan view of the machine of Fig. 13, the chute being shown in section.
Figure 22:
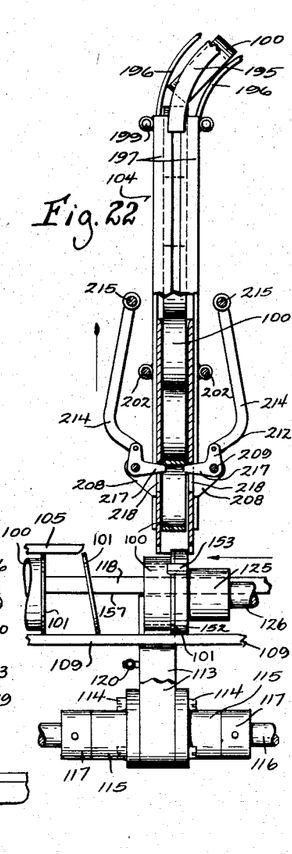
Fig 22 is a view similar to that shown in Fig. 21 but showing the plunger advanced in the course of its movement toward the throat and just after it has reached the carrier, the chute box being shown in a position elevated above the path of the plunger.

As best shown in Fig. 13 a core chute indicated generally by reference character 104 leads from the same type of hopper 75 used in the Fig. 1 embodiment of the invention to the assembly station. It is through this chute that cores 100 are continuously fed as hereinbefore described. The structure of the chute 104 at its terminal end, however, is modified somewhat over the structure of chute 20 shown in Fig. 1. The details of this modification are shown in Figs. 20 through 22 and will be described hereinafter more in detail.

As in the embodiment of the invention shown in Figs. 1 through 10, I provide a throat comprising longitudinally extending runners. These runners comprise slats which converge somewhat toward the discharge end thereof to offer resistance to the forward movement of assembled components therein. In the embodiment of Figs. 1–11, I provide three runners 85–87. Here, however, I provide four runners 105, 109, 110, 118, best shown in Fig. 19. Only the bottom runner 109 is continuous through the assembly station beneath the chute 104. Top runner 105 terminates short of the assembly station and side runners 110, 118 continue through the assembly station but are of reduced height, as shown at 157, through the range of movement of the component carrier. All runners 105, 109, 110, 118 are arcuate in cross section as shown in Fig. 19 to constitute circumferentially discontinuous segments of a cylindrical tube.

Figures 18, 19, 23, 24:
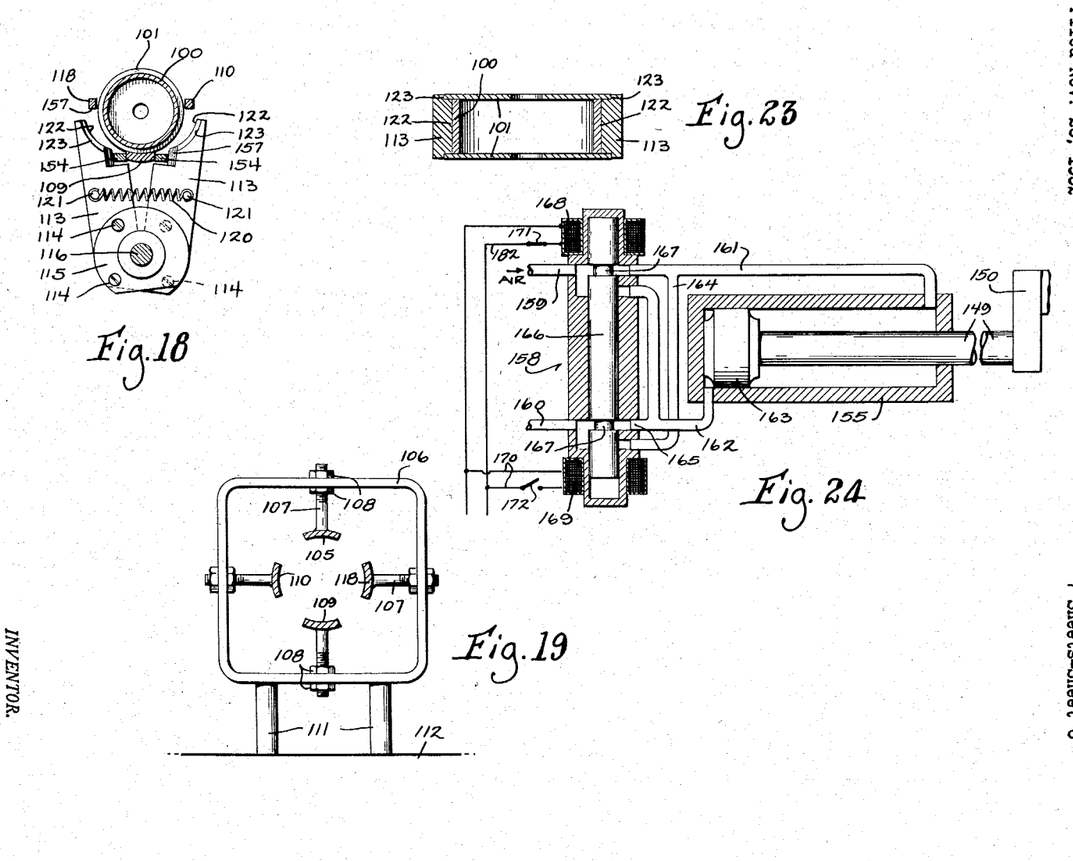
Fig. 18 is a cross sectional view taken along the line 18—18 of Fig. 17.
Fig. 19 is a cross sectional view taken along the line 19—19 of Fig. 13.
Fig. 23 is a fragmentary cross section taken along the line 23—23 of Fig. 20 but showing both head discs and a core as assembled thereon as these parts would appear in their Fig. 15 position.
Fig. 24 is a cross sectional view taken through the valve mechanism by which the action of fluid motor 155 is controlled.

As indicated in Fig. 19 I provide spiders 106 at intervals along the length of the throat for the support of the runners 105, 109, 110, 118 in properly spaced relationship. The runners are supported on bolts 107 having threaded ends engaged at either side of the spiders by nuts 108. Adjustment of the bolts will determine the exact position assumed by the runners. As indicated in Fig. 13 the spiders 106 are supported by brackets 111 from base 112 of the machine frame.

Figures 20, 21:
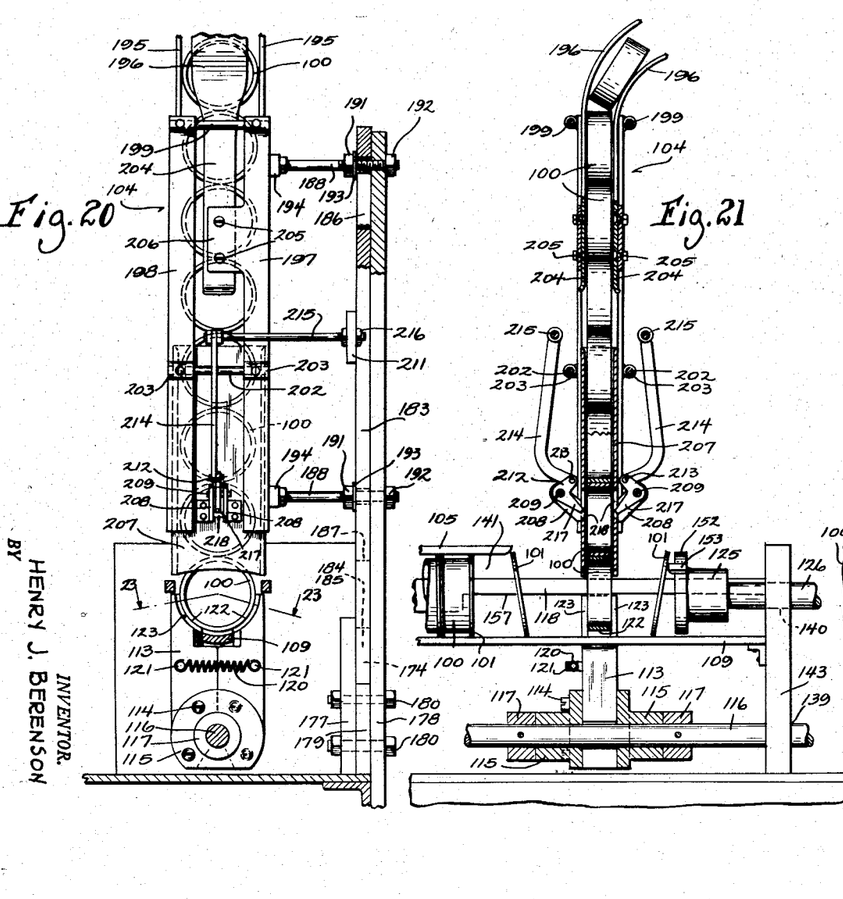
Fig. 20 is a vertical elevation taken through the assembly station of the machine, certain parts being broken away and shown in cross section.
Fig. 21 is a side elevation of the assembly station of the machine, portions being broken away and shown in cross section.

Guided for reciprocation along the lowermost runner 109 is a component carrier best shown in Figs. 18 and 20. In its normal or retracted position below chute 104 (Figs. 13 and 20), the pivoted arms 113 of the carrier are held closed by spring 120 against lower runner 109. The lower ends of the arms 113 are fastened separately by means of bolts 114 to separate hubs 115 which are pivoted for oscillation on the reciprocable rod 116. As best shown in Fig. 13 the shaft 116 is provided with adjustably fixed collars 117, the adjustment of which determine the position of the component carrier thereon.

Coil spring 120 is connected by suitable anchors 121 to each arm and is tensioned to bias the arms 113 toward the position shown in Fig. 20 in which the facing edges of the arms 113 engage and the arms are closed on the runner 109. The arms 113 may, however, pivot on hubs 115 to their mutually divergent position shown in Fig. 18, upon action of cam rails 154 as hereinafter described.

As best shown in Fig. 23 the top portions of each arm segment 113 is contoured to provide a central core saddle 122 and side head disc support rabbets 123 at a level arcuately offset and generally lower than the core saddle 122. When the arms 113 of the carrier are closed into the positions shown in Figs. 20–22 the rabbets 123 thereof complement the lateral arc of the runner 109, and form a continuation thereof, and connect runner 109 with the narrowed portions 157 of side runners 110, 118.

Thus the head discs 101, which are positioned manually on runner 109 as shown in Fig. 21, will seat in the rabbets 123 when pusher 125 is actuated as hereinafter explained. The head discs 101 are supported both by the lower runner 109 and by rabbets 123. As core saddle 122 projects above the level of the bottom runner 109, as is clearly shown in Figs. 20 through 22, the core saddle will support core 100 in flanged relation to the head discs 101. The cores 100 normally descend by gravity in chute 104 until they contact the core saddles 122 of arms 113 at both sides of the bottom runner 109.

Pusher head 125 is mounted on piston rod 126 under the control of the piston 127 in cylinder 128 (Figs. 13, 14). Cylinder 128 is provided with an air connection 129 and with a valve control including cross conduit 124 and actuating switch button 132 which determines which side of the piston 127 is placed under pneumatic pressure. The switch button 132 is actuated by the bell crank 133 which is pivoted at 134 on a bracket 135 mounted on the cylinder 128. Bell crank arm 133 is further pivoted at 136 to link 137 which extends into pivoted connection with the disc pusher 131 on pregluer 17. Accordingly, as in the device of Figs. 1 through 10, movement of the disc pusher 131 will coordinate the movements of the plunger 125 in timed relation to the disc pusher. As the disc pusher 131 moves forward bell crank arm 138 depresses switch button 132 to pressurize the cylinder behind piston 127 and start the pusher 125 toward the throat 141 formed by the runners 105, 109, 110, 118.

The base 112 of the machine frame also carries bracket supports 142 and 143 which are provided with aligned bearing apertures 140 to support and guide piston rod 126 for reciprocation. These brackets are also provided with aligned bearing apertures 139 to carry shaft 116 on which the carrier arms 113 are mounted as aforesaid. As best shown in Figs. 13 and 14, shaft 116 projects beyond bracket 142 and is provided with a coil spring 144 in compression between bracket 142 and a stop collar 145 at the end of shaft 116. Spring 144 biases the shaft to the left as shown in Figs. 13 and 14 to normally position the carrier arms 113 directly beneath the mouth of chute 104.

Shaft 116 is provided with another collar 146 to receive the thrust of an arm 147 mounted on the piston rod 126. Arm 147 is provided with a mounting hub 148 and with an adjustable set screw 151 for adjustment of the arm axially of the piston rod.

Arm 147 is so adjusted in its spaced relationship with collar 146 on shaft 116 to engage collar 146 in the forward movement of the piston rod just as the pusher head 125 seats disc 101 into rabbet 123 of the carrier. Continued movement of the piston rod 126 advances the carrier along with the pusher 125 as is shown in Fig. 22. Note that pusher 125 is provided with a head plate 152 having guide lugs 153 which cradle the head disc 101 in the course of movement of the piston from its Fig. 21 position to its Fig. 22 position.

Continued forward movement of the pusher 125 will advance it through and beyond its position shown in Fig. 15. In the course of this movement the other head disc 101 will be picked up and seated in rabbets 123 of carrier arms 113. Ultimately the assembled components are forced into the restricted throat 141 and wedged between the runners 105, 109, 110, 118.

As best shown in Figs. 13 and 15 through 18 the bottom runner 109 is provided with cam rails 154. These are mounted for limited sliding reciprocation along the side margins of runner 109 and their movement is powered by the fluid motor 155 to be hereinafter described. In the course of the movement of the carrier arms 113 from the dotted line position to the full line position in Fig. 16 the cam rails 154 are stationary. When the carrier reaches its full line position the bevelled ends 156 of the cam rails 154 engage the bevelled cam follower portions 157 of the carrier arms 113 to cam said arms apart and against the bias of the tension spring 120. The position of the carrier arms 113 after they have been cammed aside is best shown in Figs. 17 and 18. Thus the rabbets 123 in the carrier arms release the peripheral margins of the head discs 101. As the assembled spool, however, is now firmly engaged by the runners forming restricted throat 141 the carrier is no longer needed to maintain the spool in assembled position. The carrier is now in condition for withdrawal upon retraction of the pusher 125.

In order to maintain the arms 113 separated during withdrawal of the carrier so as not to pull the spool from the throat the cam rails 154 may be motivated by fluid motor 155 to slide them along the margins of the bottom runner 109 from their position shown in Fig. 16 to their position shown in Fig. 17. Thus, when the carrier withdraws, its arms 113 will be held apart until well clear of the last assembled spool whereupon the arms may close under bias of spring 120 for re-positioning under the chute 104.

Fluid motor 155 is controlled by valve 158 shown in Fig. 24. Valve 158 is provided with air inlet port 159 and air exhaust port 160. Inlet port 159 alternatively feeds air line 161 connected to cylinder 155 at one side of piston 163 or air line 162 connected to cylinder 155 at the other side of piston 163.

Exhaust port 160 is fed selectively by air line 164 which branches from air line 161 or air line 165 which branches from air line 162. Solenoid operated valve member 166 is provided with valve openings 167 which are so spaced in the member 166 that when air line 161 is connected to the inlet port 159, air line 162 is connected (through line 165) to exhaust port 160. Conversely when air line 162 is connected to inlet port 159, air line 161 is connected (through line 164) to exhaust port 160.

Valve member 166 is selectively attracted by solenoid coils 168 and 169. These are connected to be separately energized so that only one coil is energized at any time.

The solenoid coils 168 and 169 in valve 158 are controlled by the microswitches 171 and 172 best shown in Fig. 14. Microswitch 171 is provided with a switch button 173 and microswitch 172 is provided with switch button 181. Microswitch 172 may be actuated to energize solenoid coil 169 through wires 170 and a source of current not shown to pressurize air line 162 and move piston 163 to the left as shown in Figs. 13 and 24. As cam rails 154 are connected to piston rod 149 through head 150 the rails 154 will be moved thereby into their positions shown in Fig. 17. This occurs when button 181 of microswitch 172 is contacted by the bevelled end 185 of operating arm 174 of piston rod 126 in the position of the parts shown in Fig. 15. This is the extreme forward position of plunger 125 and the spool components are fully seated in throat 141.

Operating arm 174 is connected by means of its lateral extension 175 to adjustable arm 147. When the piston rod 126 is fully retracted the lateral extension 175 of operating member 174 engages the button 173 of microswitch 171 to energize solenoid coil 168 through wires 182 and a separate source of current not shown to pressurize air line 161 and retract piston 163 and cam rails 154 to initial position.

The operating member 174 is guided for movement in a way formed by the uprights 77, 177 and 178 best shown in Figs. 14 and 20. Uprights 177 and 178 are spaced by the spacer 179 and are secured thereto by the nuts and bolts 180. Thus operating member 174 slides on the top margin of spacer 179 and is guided between uprights 177 and 178.

The operating member 174 not only actuates microswitches 171, 172 but actuates slide member 183 which is connected to raise and lower box 207 at the mouth of chute 104. Note that the lower end of slide 183 is bevelled as indicated at 184 in Fig. 15. The end of operator 174 is also bevelled as indicated at 185. Slide 183 is also provided with vertical slots 186 and 187 through which extend bolts 188. The bolts are provided with opposed nuts 191, 192 and nuts 191 are provided with washers 193 which cooperate with the upright 178 to provide a vertical way in which the slide 183 is movable. Thus reciprocation of the operating member 174 will raise slide 183 on advance of pusher 125 and lower slide 183 when the pusher 125 is retracted. Bolts 188 also extend to rigid connection at 194 with the chute 104 for the support thereof.

The construction of the chute 104 will now be described. Chute 104 is considerably more complex than chute 20 of the embodiment of the invention shown in Figs. 1-11. Chute 104 comprises end slats 195 and side slats 196. The terminal portions of these slats are connected to and are supported by the corner angle members 197 and 198 which comprise channel extensions of the slats 195, 196. Corner members 197 are supported from upright 178 by the bolts 188. Corner members 198 are cross connected at the top of the angle members by the strap 199 and intermediate their top and bottom by the cross pins 202 adjustably mounted in the anchor bearings 203. Side slats 196 are extended below the level of strap 199 at 204 and connected by means of the bolts 205 to ears 206 of the angle members 197 for further support of these slats.

The bottom of the chute is provided with a vertically movable guide box 207 which fits within the outline of angle members 197, 198 as shown in Fig. 14, and is vertically reciprocable as actuated by the slide 183. Box 207 is sized to freely receive the descending cores 100. Box 207 is provided with angle brackets or ears 208 which extend outwardly in the space between corner members 197, 198. Ears 208 carry on pins 209 bell cranks 212 further pivoted on pins 213 to lift links 214 in turn pivotally connected with rods 215 bolted at 216 to lateral extensions 211 at both sides of slide 183 (Figs. 15, 20). On lifting of slide 183 and upward pressure on links 214, arms 217 of the bell cranks 212 will pivot inwardly and are aligned to enter vertical slots 218 in the sides of slide box 207 to the position indicated in Fig. 22. In this position the arms 217 engage the undersurface of the top of the core 100 which normally rests on the lowermost core which is supported in core saddle 122.

Thus when the actuator 174 engages the bevelled end 184 of the slide 183 the entire slide moves upwardly to the limit permitted by engagement of the bolts 188 in the slots 186, 187 and first pivots the bell crank 212 to cause its arms 217 to extend through the slots 218 and lift said core 100. Continued upward movement of the slide 183 lifts the entire box 207 bodily upwardly in the channel formed by the angle members 197, 198. The range of movement of slide 183 is such that box 207 is lifted clear of the path of the pusher head plate 152 and the contents of the carrier. In the upward movement of box 207 the arms 217 of a bell crank 212 are steadied by engagement with the top of the slots 218 in the sides of the box.

As indicated in Fig. 15 the actuator 174 coacts with the bevelled end 184 of slide 183 in the first increment of pusher movement so that the box 207 is raised well before arm 147 of piston shaft 126 engages the collar 146 on shaft 116 to move the carrier 113. It is only after the pusher and carrier are completely retracted that the bevelled end 185 of actuator 174 again coacts with the bevelled end 184 of slide 183 to lower the box 207 into position where it again guides the gravity descent of the next succeeding core 100 into engagement with the carrier 113.

Spring 144, of course, is of such strength as to return the carrier 113 to its initial position as soon as the thrust of the arm 147 on collar 146 is released. Collar 145 follows arm 147 until collar 210 engages bracket 142 to define the retracted position of carrier 113 under the mouth of chute 104.

From the foregoing, it is clear that advance of the pusher and carrier, the elevation of the box 207 in the chute 104, the action of the cam rails 154, retraction of the pusher and carrier and the return of the cam rails 154 and box 207 to normal position comprise movements which are all coordinated in timed relation with the action of the disc pusher 131. Advance of disc pusher 131 depresses valve button 132 to advance the piston rod 126. Retraction of disc pusher 131 releases the valve button which retracts piston rod 126. The functioning of all other elements is controlled and timed by movement of the piston rod 126. The coordination in the embodiment of Figs. 11-24 is fundamentally the same as in the embodiment of Figs. 1 through 10. Because, however, of the added mechanism in Figs. 11-24 to accommodate for the flanges on the spools, the embodiment of Figs. 11-24 incorporates more cooperative structure.

I claim:

1. In a machine of the character described, an assembly throat comprising means for the successive reception of a plurality of product components at one end thereof for passage therethrough, said means comprising spaced runners mounted in a longitudinally extending arcuate series and mutually converging to offer increasing resistance to forward movement of said components through said throat whereby to cause them to be interengaged in said throat in an assembly operation, in combination with reciprocatory means axially aligned with said throat to force components through said throat, in further combination with an assembly station comprising means for supporting the product components at different levels, means for advancing said support means in timed coordination with the reciprocating means toward said throat, and means for disengaging said support means from said components at said throat.

2. The device of claim 1 in further combination with a chute having a terminal end over the retracted position of the support means, and means actuated by forward movement of said reciprocating means for elevating product components in said chute out of the path of the said support means and its contents.

3. An assembly machine for assembling components including a loading station, first component supply mechanism including a first component feeder for feeding first components toward said loading station, a second component feeder separated from said first component feeder for delivering second components to said loading station, an assembly throat to receive the said first and second components, a plunger for urging the components into said throat, means for locking the action of the plunger with the action of the first component supply mechanism whereby first components are delivered by said first component feeder in timed coordination with the plunger, in further combination with means for the support of said second components normally below said chute at one level and said first component at a different level whereby said components are in flanged relation, means for advancing said support means in timed coordination with the plunger toward said throat, and means for disengaging said support means from said components at said throat.

4. The device of claim 3 in further combination with means actuated by the forward movement of said plunger for shifting product components in said second component feeder out of the path of the said support means and its contents.

5. The device of claim 4 in which said second component feeder comprises a chute, said chute further comprises a guide slide, said means for shifting the product components comprising means for exerting upward thrust on said guide slide and elevating said slide with said product components out of the path of said support means and its contents.

6. A machine for the assembly of core and head disc components in flanged relation, said machine comprising means forming a throat, a plunger, a core support carrier intermediate said throat and plunger and a component feeder disposed in discharge relation to said carrier, said carrier being provided with a core saddle end with head disc supports at a level offset from the saddle whereby to support said head discs and core in flanged relationship, means for reciprocating the plunger in a path aligned with said throat whereby said plunger engages the contents of the carrier in its advance toward said throat, said carrier being movable on a path substantially parallel to the path of the plunger and having means coupling it with the plunger whereby to move in timed coordination with the plunger in its advance toward said throat, said machine being further provided with means for disengaging the carrier from its contents at said throat whereby to deposit said contents at said throat, and means for withdrawing the carrier from the throat upon retraction of the plunger.

7. The device of claim 6 in which said coupling means comprises a shaft, said carrier comprising arms pivotally mounted on the shaft, the free ends of the arms together constituting said saddle and core disc supports when the arms are parallel whereby to receive said core and said head discs in assembled relation, said throat being provided with means to cam said arms apart to open the saddle and disengage said arms from said components at the throat.

8. The device of claim 7 in which said throat comprises a runner extending beyond the throat and beneath said component feeder, said arms having relieved portions at the level of said runner and in slidable engagement with the runner when the arms are parallel.

9. The device of claim 7 in which said cam means comprises fingers mounted for slidable movement in the path of carrier movement, and means for advancing said fingers toward said carrier when the carrier arrives at the throat whereby said cams will be effective to hold the carrier arms apart during at least part of the withdrawal movement of the carrier.

10. The device of claim 9 in which said fingers are provided with power means for their actuation, switch means for control of said power means, said plunger being provided with means for actuating said switch means for actuating said fingers in timed coordination with plunger movement.

11. A machine for the assembly of a core and head discs in flanged relation to the core, said machine comprising means forming a throat, a plunger, a core support carrier intermediate said throat and plunger and a chute having a terminal end above said carrier, said carrier being provided with a core saddle end with head disc supports at a level offset from the saddle whereby to support said head discs and core in flanged relationship, means for reciprocating the plunger in a path aligned with said throat whereby said plunger engages the contents of the carrier in its advance toward said throat, said carrier being movable on a path substantially parallel to the path of the plunger and having means coupling it with the plunger whereby to move in timed coordination with the plunger in its advance toward said throat, said machine being further provided with means for disengaging the carrier from its contents at said throat whereby to deposit said contents at said throat, and means for withdrawing the carrier from the throat upon retraction of the plunger, said chute comprising a guide channel and a box slidable therein, said box normally projecting into the path of plunger advance, said chute being provided with means for raising the box out of the path of plunger advance, and means responsive to forward movement of the plunger for actuating said box raising means.

12. The device of claim 11 wherein said means responsive to the forward movement of the plunger comprises a cam mounted for movement with the plunger, said box being provided with lift means actuated by said cam.

13. The device of claim 12 in which said lift means comprises bell cranks mounted on said box, said box being provided with slots adjacent said mountings, said bell cranks comprising fingers movable through said slots when actuated by said lift means to engage a core within said box.

14. In a device of the character described, a chute comprising channel forming members, a box slidable in said channel, said box being provided with a slot aligned in the direction of the channel, a bell crank and means mounting said bell crank on said box externally of the chute, said bell crank having an arm aligned for pivotal movement through said slot and into the box, and box shifting means connected to said bell crank for concurrently shifting the box in the chute and projecting the bell crank arm into the box.

15. In a device of the character described the subcombination of a carrier comprising a rod, arms pivotally supported on and connected at corresponding ends to said rod and having opposed corresponding ends free for limited movement, said free ends being provided with discontinuous portions of a common saddle, bias means for closing said arms to complete the saddle, means for reciprocating said rod together with said carrier and means in the path of carrier reciprocation for opening said arms against said bias means.

16. In a device of the character described, including a restricted throat, a reciprocating pusher and a station between the pusher and throat at which component parts are assembled, a component part carrier reciprocable from the assembly station to the throat and back to the station, means for reciprocating the pusher and means for guiding the carrier on a path substantially parallel to the path of the pusher, and means interconnecting the pusher and carrier whereby the carrier reciprocates in timed coordination with the pusher.

17. The device of claim 16 in which said throat comprises spaced runners, one of said runners being provided with an extension with which the carrier is slidably engaged and comprising said guide means.

18. In an assembly machine for a core and end discs, a support on which the end discs are disposed in spaced relation, a core feeder having a discharge end between said spaced end discs, a reciprocating plunger having an axis of reciprocation transverse to said core feeder, means forming an assembly throat offset axially on the path of plunger movement from the said support and into which said plunger forces said end discs and intervening core, means to restrain advance of cores by said feeder during the course of plunger movement below and beyond said chute and means for advancing concurrently with the plunger the support together with said core and end discs.

19. A component assembly machine comprising a loading station having a support on which first components may be positioned in spaced relation, first component supply mechanism including a first component feeder for feeding first components toward said loading station, a second component feeder separate from said first component feeder and aligned for delivering second components to said loading station between spaced first components at said station, an assembly throat to receive said first and second components in endwise relation, a plunger separate from both of said feeders for transferring the components from the loading station to the assembly throat and for urging the components into said throat, said assembly throat being offset along the axis of plunger movement from said loading station, and means for coordinating the action of the plunger with the action of the first component supply mechanism whereby first components are delivered by said first component feeder in timed coordination with the plunger.

20. The device of claim 19 in which said support comprises a component carrier, means on which the carrier reciprocates from said station to said throat and back to said station and means interconnecting the plunger and carrier whereby the carrier reciprocates in timed coordination with the plunger.

(References on following page)

References Cited in the file of this patent

UNITED STATES PATENTS

| Number | Name | Date |
|---|---|---|
| 663,401 | Young | Dec. 4, 1900 |
| 842,169 | Blood | Jan. 29, 1907 |
| 1,281,920 | Ericson | Oct. 15, 1918 |
| 1,840,470 | Schneider | Jan. 12, 1932 |
| 1,842,142 | Becker | Jan. 19, 1932 |
| 1,855,441 | Crouse | Apr. 26, 1932 |
| 1,862,351 | Hagiwara | June 7, 1932 |
| 2,042,719 | Lindgren | June 2, 1936 |
| 2,075,315 | Albrecht | Apr. 6, 1937 |
| 2,131,967 | Peropat | Oct. 4, 1938 |
| 2,140,046 | Boule | Dec. 13, 1938 |
| 2,200,269 | Fischer | May 14, 1940 |
| 2,216,276 | Mann et al. | Oct. 1, 1940 |
| 2,259,256 | Maas et al. | Oct. 14, 1941 |
| 2,280,522 | Hahn | Apr. 21, 1942 |
| 2,296,964 | Ushakoff | Sept. 29, 1942 |
| 2,329,263 | Gladfelter | Sept. 14, 1943 |
| 2,388,911 | Fink | Nov. 13, 1945 |
| 2,446,644 | Fischer | Aug. 10, 1948 |
| 2,452,357 | Collins | Oct. 26, 1948 |
| 2,483,028 | Waldinger | Sept. 27, 1949 |
| 2,593,801 | Sauer | Apr. 22, 1952 |
| 2,660,949 | Russell | Dec. 1, 1953 |
| 2,677,408 | Wesstrom et al. | May 4, 1954 |